(12) United States Patent
Van Liempd et al.

(10) Patent No.: US 11,927,479 B2
(45) Date of Patent: Mar. 12, 2024

(54) SMART CONTACT LENS WITH RATIOMETRIC LIGHT CHANGE DETECTION

(71) Applicants: IMEC VZW, Leuven (BE); Stichting IMEC Nederland, AE Eindhoven (NL)

(72) Inventors: Chris Van Liempd, Schijndel (NL); Andres Felipe Vasquez Quintero, Antwerp (BE); Herbert De Smet, Destelbergen (BE)

(73) Assignees: IMEC VZW, Leuven (BE); STICHTING IMEC NEDERLAND, Eindhoven (NL)

( * ) Notice: Subject to any disclaimer, the term of this patent is extended or adjusted under 35 U.S.C. 154(b) by 190 days.

(21) Appl. No.: 17/613,529

(22) PCT Filed: May 19, 2020

(86) PCT No.: PCT/EP2020/063919
§ 371 (c)(1),
(2) Date: Nov. 23, 2021

(87) PCT Pub. No.: WO2020/234278
PCT Pub. Date: Nov. 26, 2020

(65) Prior Publication Data
US 2022/0252450 A1 Aug. 11, 2022

(30) Foreign Application Priority Data
May 23, 2019 (EP) ..................... 19176095

(51) Int. Cl.
*G01J 1/44* (2006.01)
*G02C 7/04* (2006.01)
(Continued)

(52) U.S. Cl.
CPC ............... *G01J 1/44* (2013.01); *G02C 7/04* (2013.01); *G02C 7/101* (2013.01);
(Continued)

(58) Field of Classification Search
CPC .. G02F 1/13312; G02F 1/137; G02F 2203/48; G01J 1/44; G01J 2001/446;
(Continued)

(56) References Cited

U.S. PATENT DOCUMENTS

| 4,091,329 A | * | 5/1978 | Fletcher | G06G 7/24 327/350 |
| 5,108,427 A | | 4/1992 | Majercik et al. | |

(Continued)

FOREIGN PATENT DOCUMENTS

| EP | 1674049 A1 | 6/2006 |
| EP | 1970732 A2 | 9/2008 |

(Continued)

OTHER PUBLICATIONS

Allos et al. "Novel low-cost ratiometric photometer", J. Phys. E: Sci. Instrum., vol. 11, 1978.*
(Continued)

*Primary Examiner* — Hoan C Nguyen
(74) *Attorney, Agent, or Firm* — MOSER TABOADA

(57) ABSTRACT

A smart contact lens (400) for detecting a ratiometric change in an incident light (126) intensity is provided, including one or more, preferably concentric, rings (410-1, 410-2, . . . , 410-N) of a liquid crystal display, LCD, type, each ring being operable between a state having a lower attenuation of light and a state having a higher attenuation of light; a circuit (420, 100, 101) for detecting a ratiometric change in an incident light intensity; and a controller (430) configured to operate the one or more rings based on an intensity of an incident light and to, as a response to the circuit (420, 100,
(Continued)

10 101) detecting a ratiometric change in the intensity of the incident light from a higher intensity state to a lower intensity state indicating that at least a beginning of a blinking of an eye of a user has occurred, initiate a re-polarization of the one or more rings. A method of operating the smart contact lens and various uses of the circuit are also provided.

15 Claims, 4 Drawing Sheets

(51) Int. Cl.
  *G02C 7/10* (2006.01)
  *G02F 1/133* (2006.01)
  *G02F 1/137* (2006.01)
(52) U.S. Cl.
  CPC .......... *G02F 1/13312* (2021.01); *G02F 1/137* (2013.01); *G01J 2001/446* (2013.01); *G02F 2203/48* (2013.01)
(58) Field of Classification Search
  CPC ... G01J 2001/4242; G02C 7/101; G02C 7/04; G02C 11/10
  See application file for complete search history.

(56) References Cited

U.S. PATENT DOCUMENTS

| | | | |
|---|---|---|---|
| 5,155,353 A | 10/1992 | Pahr | |
| 5,329,206 A * | 7/1994 | Slotkowski | B60Q 1/1423 315/159 |
| 5,498,865 A | 3/1996 | Gaboury et al. | |
| 9,072,465 B2 | 7/2015 | Pugh et al. | |
| 10,292,810 B1 | 5/2019 | Haddock et al. | |
| 2004/0233383 A1 | 11/2004 | Sandler et al. | |
| 2008/0055541 A1* | 3/2008 | Coulter | G02C 7/101 351/159.45 |
| 2009/0033863 A1 | 2/2009 | Blum et al. | |
| 2009/0204207 A1 | 8/2009 | Blum et al. | |
| 2013/0303921 A1* | 11/2013 | Chu | A61B 5/0059 600/476 |
| 2014/0081178 A1 | 3/2014 | Pletcher et al. | |
| 2017/0097520 A1 | 4/2017 | Lee | |
| 2018/0246049 A1* | 8/2018 | Gutierrez | G02C 11/10 |
| 2018/0275424 A1* | 9/2018 | Lee | G02C 7/081 |

FOREIGN PATENT DOCUMENTS

| | | |
|---|---|---|
| EP | 3125021 A1 | 2/2017 |
| JP | S5737221 A | 3/1982 |
| JP | H-04174566 A | 6/1992 |
| JP | H-07135453 A | 5/1995 |
| JP | 2007201350 A | 8/2007 |
| JP | 2013513127 A | 4/2013 |
| WO | WO-2013059656 A2 | 4/2013 |
| WO | WO-2014064259 A1 | 5/2014 |
| WO | WO-2017058401 A1 | 4/2017 |
| WO | WO-2018111992 A1 | 6/2018 |

OTHER PUBLICATIONS

A de Sa and D G McCartan, "Ratiometric measurements in optical absorption Spectroscopy", J. Phys. E: Sci. Instrum. 9 725, (1976).*
Andrés Felipe Vasquez Quintero et al: "Design and modelling of thermoformed displays for smart contact lenses", SID-ME fall meeting 2016, Berlin Conference Paper S5-1, p. 14-15.
Celine Vanhaverbeke et al: "A biocompatible active artificial iris", SID-ME fall meeting 2016, Berlin Conference Paper S5-2, p. 16-17.
Andrés Felipe Vasquez Quintero et al: "Stretchable platform enabled with wireless power for smart contact lenses", MRS Fall 2017, Boston, Conference Paper (Poster), 1 page.
Herbert De Smet et al: "Simple multifocal lens based on liquid crystals", EuroDisplay 2017, Berlin, EuroDisplay 2017 Conference Abstract Book, p. 49-50.
Xu et al: "Interaction of aberrations, diffraction, and quantal fluctuations determine the impact of pupil size on visual quality", Journal of Optical Society of America A, vol. 34, No. 4, pp. 481-492, 2017.
Vasquez Quintero et al: "Liquid crystal displays compatible with contact lenses for vision correction applications", International Display Workshop (IDW), IDW 2018, Conference Paper (Proceedings Paper), p. 3, Japan, Nagoya, 2018.
Extended European Search Report in EP19218776.3 dated Jun. 19, 2020.
Ando et al: "Light Attenuation by the Human Eyelid", Biol Psychiatry, 39, pp. 22-25, 1996.
Hsu et al: "Concentric polymer-dispersed liquid crystal rings for light intensity modulation", Sensors and Actuators A: Physical, vol. 169, No. 2, pp. 341-346, 2011.
Kwon et al: "High-speed camera characterization of voluntary eye blinking kinematics", Journal of the Royal Society Interface, 10, Feb. 27, 2013, pp. 1-6, 2013.
De Roose et al: "An active artificial iris controlled by a 25-µW flexible thin-film driver", IEEE International Electron Devices Meeting, IEDM16-798-IEDM16-801, 2016.
Wikipedia: "Log amplifier", https://en.wikipedia.org/w/index.php?title=Log_amplifier&oldid=859414094, available on Sep. 13, 2018.
International Search Report and Written Opinion for PCT/EP2020/063919 dated Aug. 26, 2020.

* cited by examiner

SMART CONTACT LENS WITH RATIOMETRIC LIGHT CHANGE DETECTION

TECHNICAL FIELD

The present disclosure generally relates to the field of smart contact lenses. In particular, the present disclosure relates to a smart contact lens with detection of a ratiometric change in an incident light intensity and a method of operating such a smart contact lens.

BACKGROUND

Smart contact lenses comprising circuits for detecting a ratiometric light change may find use in various applications, including for example detection of a blinking of an eye or detection of a moving object. To be able to detect a light change in e.g. both dim indoor lighting conditions and bright outdoor lighting conditions, there is a need for such a circuit to have a high dynamic range.

SUMMARY

To at least partly fulfil the above need, the present disclosure seeks to provide an improved smart contact lens for detecting a ratiometric change in an incident light intensity, as well as a method of operating such a smart contact lens, as defined in the independent claims. Further embodiments are provided in the dependent claims.

According to one aspect of the present disclosure, a smart contact lens is provided. The smart contact lens comprises one or more, preferably concentric, rings of a liquid crystal display, LCD, type, each ring being operable between a state having a lower attenuation of light and a state having a higher attenuation of light. The smart contact lens also comprises a circuit for detecting a ratiometric change in an incident light intensity; and a controller configured to operate the one or more rings based on an intensity of an incident light and to, as a response to the circuit detecting a ratiometric change in the intensity of the incident light from a higher intensity state to a lower intensity state indicating that at least a beginning of a blinking of an eye of a user has occurred, initiate a re-polarization of the one or more rings.

A smart contact lens as described herein may offer a way of for example artificially mimicking the iris function of an eye. This may be helpful to individuals which, due to for example cancer, acute injury or for other reasons, suffer from problems with the iris. By individually activating or deactivating one or more rings of an LCD type arranged in the iris area, the incident light to the eye may be controlled based on for example an ambient light level.

Once an LCD ring has been activated it normally needs to be re-polarized after a few seconds in order not to lose its contrast. Such re-polarization may be visible to the user of the contact lens in form of undesired light flicker. If, however, the LCD ring is instead re-polarized while the eyelid of the eye is closed (e.g. during a blinking of the eye), the re-polarization may be performed without noticeable light flicker to the user. For some LCD types, re-polarization of a ring may be desirable also for other reasons. For example, if a ring is of e.g. a ghost-host display type, repeated re-polarization may be desirable to prevent degradation of the crystal cell(s).

If the lens is installed/provided in an eye, the above change in intensity may for example correspond to a beginning of a blinking of the eye. By re-polarizing the one or more rings during the blinking of the eye (i.e. while the eyelid is closed), little or no visual flickering due to the re-polarization may be experienced by the user of the contact lens.

The circuit may include a light sensor configured to induce a photocurrent through it as a function of an intensity of an incident light. The light sensor may for example be a photodiode, photodetector or photosensor, or another element (i.e. a photosensitive device) which may provide a photocurrent through it as a function of the intensity of the incident light.

The circuit may include an operational amplifier, which may increase the signal to noise ratio of the detected change in incident light intensity.

The light sensor may be connected to an inverting input of the operational amplifier, which may increase the signal to noise ratio of the induced photocurrent.

The circuit may include a feedback loop. The feedback loop may connect an output of the operational amplifier to the inverting input of the operational amplifier. The feedback loop may include at least one circuit element. The at least one circuit element may have a logarithmic voltage-current dependence. The feedback loop allows for negative feedback, increasing stability of the circuit. A circuit element with a logarithmic voltage-current dependence allows the circuit to detect light changes within a high dynamic light range, and to work from e.g. both dimmed indoor light to full sun light.

The circuit may include a high-pass filter. The high-pass filter may be configured to filter a signal output from the operational amplifier to generate a high-pass filtered signal. The high-pass filtered signal may have a higher signal-to-noise ratio.

The circuit may further include a comparison element. The comparison element may be configured to receive the high-pass filtered signal. The comparison element may be configured to compare the high-pass filtered signal with at least a first threshold value. The comparison element may be configured to output a signal which, as a response to an amplitude of the high-pass filtered signal passing the at least a first threshold value, changes to indicate a ratiometric change in the intensity of the incident light. The comparison element allows for a clear detection of relevant ratiometric change in incident light intensity, thereby reducing the requirements of the controller.

The operational amplifier may be a generic ultra-low power operational amplifier, and the circuit may operate with low or minimal consumption of supply current. This allows the circuit to be powered e.g. by a small thin film battery. Such a battery may be provided on the smart contact lens. Also, due to a low component count, the provided circuit requires a lower footprint, making it even more suitable for use as e.g. a blink detector in a smart contact lens.

In some embodiments, the light sensor may be connected between the inverting input and a non-inverting input of the operational amplifier.

In some embodiments, the at least one circuit element may be or include a diode or at least a two-terminal element behaving like a diode. Particularly, a diode-like behavior is understood to mean an element wherein a voltage across the element has a logarithmic dependence on a current through the element.

In some embodiments, the at least one circuit element (e.g. the diode or element behaving like a diode) may be arranged in the feedback loop with one terminal towards the inverting input of the operational amplifier and another terminal towards the output of the operational amplifier. Here, "towards" does not necessarily indicate a physical location of something (i.e. that something is physically pointing towards something), but rather a topological arrangement. Phrased differently, the at least one circuit element may be arranged such that e.g. an electrical path (or electrical current) running from the inverting input of the operational amplifier (or at least from a node to which the inverting input of the operational amplifier is connected) towards the output of the operational amplifier first reaches the one terminal of the element before reaching the another terminal of the element.

In some embodiments, the at least one circuit element may be a diode, arranged within the feedback loop with its cathode towards the inverting input of the operational amplifier and its anode towards the output of the operational amplifier. The light sensor may e.g. be a photodiode, and arranged with its cathode towards the inverting input of the operational amplifier and its anode towards e.g. a ground or to the non-inverting input of the operational amplifier. In some embodiments, the at least one circuit element may be a diode, arranged within the feedback loop with its anode towards the inverting input of the operational amplifier and its cathode towards the output of the operational amplifier. The light sensor may e.g. be a photodiode, and arranged with its anode towards the inverting input of the operational amplifier and its cathode towards e.g. a ground or to the non-inverting input of the operational amplifier.

In some embodiments, the comparison element may be a comparator. Such a comparator may for example output a signal which, depending on whether an input signal to the comparator is above or below a threshold value, assumes one of two states (such as e.g. a higher voltage state and a lower voltage state). The comparator may for example be realized using a differential amplifier or similar, wherein the high-pass filtered signal is provided as one input and a signal indicative of the first threshold value as another input, and wherein the differential amplifier saturates at for example a positive or negative rail voltage depending on whether one input is larger than the other or vice versa. Other ways of implementing a comparator are of course also envisaged.

In some embodiments, the comparator may be a hysteretic comparator. The signal output from the comparator may then change as a response to the high-pass filtered signal passing both the first threshold value and a second threshold value different from the first threshold value. Phrased differently, the comparator may not change its output signal directly when the high-pass filtered signal crosses a single (i.e. the first) threshold value, but only when the high-pass filtered signal also crosses the second threshold value, thus introducing hysteretic behavior in that the output value of the comparator plotted as a function of the high-pass filtered signal will not follow a same curve when the value of the high-pass filtered signal changes in one direction (e.g. from a lower value to a higher value) as when the value of the high-pass filtered signal changes in an opposite direction (e.g. from the higher value to the lower value). It is envisaged that the hysteretic behavior of the comparator may be an intrinsic feature of a comparator, or e.g. implemented using for example a Schmitt-trigger circuit or similar. Using a hysteretic comparator may for example provide an output signal which is more immune to noise which causes the high-pass filtered signal to fluctuate around the first threshold value, and which only changes its output state once the input (e.g. the high-pass filtered signal) goes outside a region of values bounded by the first threshold value and the second threshold value.

In some embodiments, the high-pass filter may have a corner frequency which may depend on a required rate of change of the circuit for a certain ratiometric change in the intensity of the incident light. Phrased differently, the corner frequency of the high-pass filter may be configured to allow a certain detection speed of the circuit.

In some embodiments, the high-pass filter may be of a switched capacitor type. Such an implementation of the high-pass filter may for example help to limit a required on-chip area of passive components such as resistors and/or capacitors.

According to a first variation of the present disclosure, a circuit for detecting a ratiometric change in an intensity of an incident light is provided. Hence, the circuit for detecting a ratiometric change in an intensity of an incident light need not necessarily be arranged in a smart contact lens.

Thus, according to the first variation, a circuit for detecting a ratiometric change in an incident light intensity is provided. The circuit may include an operational amplifier. The circuit may include a light sensor configured to induce a photocurrent through it as a function of an intensity of an incident light. The light sensor may for example be a photodiode, photodetector or photosensor, or another element (i.e. a photosensitive device) which may provide a photocurrent through it as a function of the intensity of the incident light. The light sensor may be connected to an inverting input of the operational amplifier. The circuit may include a feedback loop. The feedback loop may connect an output of the operational amplifier to the inverting input of the operational amplifier. The feedback loop may include at least one circuit element. The at least one circuit element may have a logarithmic voltage-current dependence. The circuit may include a high-pass filter. The high-pass filter may be configured to filter a signal output from the operational amplifier to generate a high-pass filtered signal. The circuit may further include a comparison element. The comparison element may be configured to receive the high-pass filtered signal. The comparison element may be configured to compare the high-pass filtered signal with at least a first threshold value. The comparison element may be configured to output a signal which, as a response to an amplitude of the high-pass filtered signal passing the at least a first threshold value, changes to indicate a ratiometric change in the intensity of the incident light.

According to a second variation of the present disclosure, a method of detecting a ratiometric change in an intensity of an incident light is provided. The method may include providing a light sensor. The light sensor may be configured to induce a photocurrent through it as a function of an intensity of an incident light. The method may include regulating, by using an operational amplifier and a feedback loop including at least one circuit element having a logarithmic voltage-current dependence, a voltage across the light sensor to or at least towards zero. The method may include high-pass filtering a signal output from the operational amplifier to generate a high-pass filtered signal. The method may further include detecting a change in the intensity of the incident light by confirming that (an amplitude of) the high-pass filtered signal passes at least a first threshold value. Such confirming may for example be obtained using a comparison element (such as a comparator) as described herein with reference to the circuit of the first aspect.

In some embodiments, detecting a change in the intensity of the incident light may include confirming that the high-pass filtered signal passes both the first threshold value and a second threshold value different from the first threshold value. This may be obtained by using e.g. a hysteretic comparator as also described herein with reference to the circuit of the first aspect.

According to a third variation of the present disclosure, a use of a circuit (e.g. according to the first variation) and/or method (e.g. according to the second variation) as disclosed and described herein to detect a blinking of an eye is provided.

According to a fourth variation of the present disclosure, a use of a circuit and/or method as disclosed and described herein to detect a movement of an illuminated object is provided.

According to a fifth variation of the present disclosure, a smart contact lens is provided. The lens may include one or more rings of liquid crystal display (LCD) type. Each ring may be operable between a state having a lower attenuation of light and a state having a higher attenuation of light. The one or more rings are preferably concentrically or approximately concentrically arranged. The rings preferably also have different inner/outer diameters, and arranged in order of inner/outer diameter. The lens may include a circuit as disclosed and described herein, e.g. the circuit according to the first aspect. The lens may further include a controller. The controller may be configured to operate the one or more rings based on an intensity of an incident light. The controller may be configured to receive the signal output from the comparator and to, as a response to the signal (received from the comparator) indicating a ratiometric change in the intensity of the incident light from a higher intensity state to a lower intensity state, initiate a re-polarization of the one or more rings.

According to a second aspect of the present disclosure, a method of operating a smart contact lens including one or more, preferably concentric, rings of a liquid crystal display, LCD, type is provided. The method may include detecting, using a circuit e.g. as comprised in the first aspect and/or according to the first variation and/or a method according to e.g. the second variation, whether a ratiometric change in an intensity of an incident light (hitting the light sensor) corresponding to at least a beginning of a blinking of an eye (for which the smart contact lens is provided) has occurred. The method may further include initiating, as a response to detecting that such at least a beginning of a blinking of an eye has occurred, a re-polarization of the one or more rings.

The present disclosure relates to all possible combinations of features recited in the claims. Further, any embodiment described with reference to the circuit according to the first variation may be combinable with any of the embodiments described with reference to the method according to the second variation, the various uses according to the third and fourth variations, the smart contact lens according to the fifth variation, and the method according to the second aspect, and vice versa.

Further objects and advantages of the various embodiments of the present disclosure will be described below by means of exemplifying embodiments.

BRIEF DESCRIPTION OF THE DRAWINGS

Exemplifying embodiments will be described below with reference to the accompanying drawings, in which.

Figure 1A:
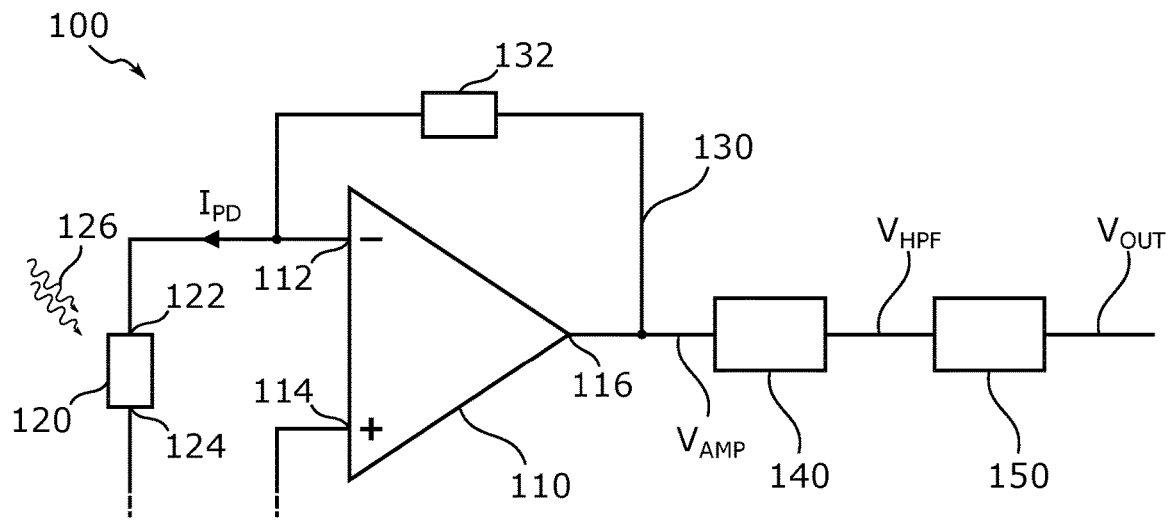
FIGS. 1a and 1b illustrate schematically various embodiments of a circuit according to the present disclosure.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the figures, the sizes of elements and regions may not necessarily be drawn to scale and may e.g. be exaggerated for illustrative purposes and, thus, are provided to illustrate the general structures of the embodiments.

DETAILED DESCRIPTION

Exemplifying embodiments will now be described more fully hereinafter with reference to the accompanying drawings. The drawings show currently preferred embodiments, but the invention may, however, be embodied in many different forms and should not be construed as limited to the embodiments set forth herein; rather, these embodiments are provided for thoroughness and completeness, and fully convey the scope of the present disclosure to the skilled person.

Figure 1B:
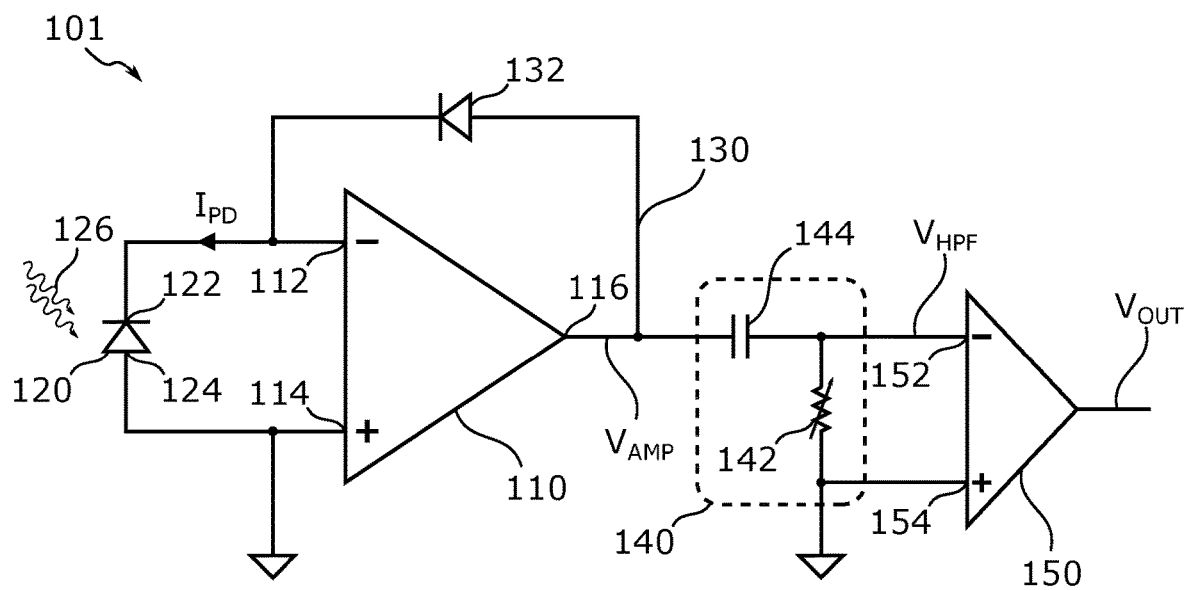

With reference to FIGS. 1a and 1b, various embodiments of a circuit for detecting a ratiometric change in an incident light intensity will now be described in more detail.

FIG. 1a illustrates schematically a circuit 100. The circuit 100 includes a light sensor 120 which has one terminal 122 connected to an inverting input 112 of an operational amplifier 110. The other terminal 124 of the light sensor 120 may be connected e.g. to ground or for example directly to a non-inverting input 114 of the operational amplifier 110. When hit by an incident light 126, the light sensor 120 induces a photocurrent $I_{PD}$ through it. The size of the photocurrent $I_{PD}$ depends on an intensity of the incident light 126.

The circuit 100 further includes a feedback loop 130. The feedback loop 130 connects an output 116 of the operational amplifier 110 back to the inverting input 112 of the operational amplifier 110. The feedback loop 130 includes a circuit element 132. The circuit element 132 is such that it has a logarithmic voltage-current dependence. Phrased differently, a voltage across the circuit element 132 changes in a logarithmic fashion with respect to a current through the circuit element 132. If no or very little current is allowed to enter the inverting input 112 of the operational amplifier 110 (e.g. by assuming the operational amplifier 110 to be ideal or at least approximately ideal), the current through the circuit element 132 may equal the induced photocurrent $I_{PD}$. A voltage across the circuit element may then be at least proportional to $\ln(I_{PD}+\alpha)$ where α is a term which may be either zero or finite. Although not illustrated in FIG. 1a, it is envisaged that the feedback loop may also include other elements in addition to the circuit element 132.

The circuit 100 further includes a high-pass filter 140. The high-pass filter 140 is connected to the output 116 of the operational amplifier, and filters a signal $V_{AMP}$ output from the operational amplifier 110 to produce a high-pass filtered signal $V_{HPF}$.

The circuit 100 includes a comparison element 150 which is connected to receive the high-pass filtered signal $V_{HPF}$ from the high-pass filter 140. The comparison element 150 is configured to compare the high-pass filtered signal $V_{HPF}$ with at least a first threshold value $V_{T1}$ and to output a signal $V_{OUT}$ based thereon. The comparison element 150 is configured such that, as a response to an amplitude of the high-pass filtered signal $V_{HPF}$ passing the at least a first threshold value $V_{T1}$, the signal $V_{OUT}$ changes to indicate a ratiometric change in the intensity of the incident light 126.

It is envisaged that the signal $V_{OUT}$ for example changes in a binary fashion between a first value (or state) $V_{S1}$ indicative of e.g. a high or higher intensity of the incident light 126 and a second value (or state) $V_{S2}$ indicative of e.g. a low or lower intensity of the incident light 126. In some embodiments, the first value $V_{S1}$ is higher than the second value $V_{S2}$ while, in other embodiments, the opposite is true. It is envisaged also that the signal $V_{OUT}$, in other embodiments, does not change in a digital fashion but rather in an analogue fashion such that the signal $V_{OUT}$ assumes more than two different values. It may be envisaged that, for example, a higher value of $V_{OUT}$ indicates a higher intensity of the incident light 126, while a lower value of $V_{OUT}$ indicates a lower intensity of the incident light 126, or vice versa, and that a change in value indicate the ratiometric change in the intensity of the incident light 126. It is also envisaged that the signal $V_{OUT}$ may instead contain information about one or both of the intensity of the incident light 126 and a change in the intensity of the incident light 126 in for example a data format. The signal $V_{OUT}$ may for example be a bit-stream coding such information about the incident light 126. In any situation, the signal $V_{OUT}$ may be further provided to and used by e.g. a controller (not shown) to for example control one or more objects based on the information about the incident light 126. As will be described later herein, such an object may for example be a smart contact lens or similar. In other embodiments, the information about the change in intensity of the incident light 126 may for example be used to detect movement of an illuminated object.

FIG. 1b illustrates schematically a circuit 101. The circuit 101 includes an operational amplifier 110, having an inverting input 112, a non-inverting input 114 and an output 116. In the circuit 101, a light sensor 120 is provided in form of a photodiode. The photodiode 120 is connected across the inputs 112 and 114 of the operational amplifier 110, such that its cathode 122 is connected to the inverting input 112 and such that its anode 124 is connected to the non-inverting input 114 of the operational amplifier 110.

A feedback loop 130 connects the output 116 of the operational amplifier 110 back to the inverting input 112 of the operational amplifier 110. In the circuit 101, the feedback loop 130 includes a circuit element 132 in form of a diode. The diode 130 is arranged such that its cathode 134 is connected to the inverting input 112 of the operational amplifier 110, and such that its anode 136 is connected to the output 116 of the operational amplifier 110. In other embodiments of the circuit 101, it may be envisaged that the directions of the two diodes 120 and 132 are reversed, such that e.g. the cathode 122 of the diode 120 is towards the non-inverting input 114 and the anode 124 is towards the inverting input 112, and such that the cathode 134 of the diode 132 is towards the output 116 and the anode 136 towards the inverting input 112.

The circuit 101 further includes a high-pass filter 140. In FIG. 1b, the high-pass filter 140 is illustrated as being formed by a voltage divider including a variable resistor 142 and a capacitor 144. Due to the impedance of the capacitor 144 being inversely proportional to frequency, various frequency components of the signal $V_{AMP}$ will distribute differently across the capacitor 144 and the variable resistor 142. A component having a lower frequency will for example distribute more across the capacitor 144 than across the variable resistor 142, while the opposite is true for a component having a higher frequency. This allows the variable resistor 142 and capacitor 144 to together function as a high-pass filter which outputs a signal $V_{HPF}$ which is a high-pass filtered version of the signal $V_{AMP}$. A corner (or cut-off) frequency of the filter 140 may be adjusted as a function of the variable resistance provided by the variable resistor 142. It is, however, envisaged also that the high-pass filter 140 may be formed in other ways, for example as a switched-capacitor high-pass filter.

The circuit 101 includes a comparison element 150 in form of a comparator. The comparator 150 is connected such that a voltage across the variable resistor 142 (e.g. $V_{HPF}$) is provided across the input terminals 152 and 154 of the comparator 150. The comparator 150 provides an output signal $V_{OUT}$ depending on a sign of a differential voltage across its input terminals 152 and 154. Depending on the sign of the differential voltage, the output signal $V_{OUT}$ obtains one of two values, such as for example a positive voltage and a negative voltage, or a zero voltage and a positive or negative voltage. In the circuit 101, the positive input 154 of the comparator 150 is connected to ground. As a result, the comparator 150 may for example be such that the output $V_{OUT}$ assumes one value when (an amplitude of) the high-pass filtered signal $V_{HPF}$ is positive, and another value when (an amplitude of) the high-pass filtered signal $V_{HPF}$ is negative. This may correspond to a first threshold value of the comparator 150 being equal to zero.

To for example avoid fluctuations of the output $V_{OUT}$ when the signal $V_{AMP}$ fluctuates around the first threshold value, the comparator 150 may be modified such that it obtains a hysteretic behavior. For example, the comparator 150 may be such that its output $V_{OUT}$ only changes once $V_{HPF}$ has passed (in a same direction) both the first threshold value and a second threshold value different from the first threshold value. For example, for a first threshold value $V_{T1}$ and a second threshold value $V_{T2} > V_{T1}$, the comparator 150 may be configured such the output $V_{OUT}$ assumes one value once $V_{HPF}$ exceeds $V_{T2}$, and assumes another, different value once $V_{HPF}$ goes below $V_{T1}$. In another embodiment, for a first threshold value $V_{T1}$ and a second threshold value $V_{T2} < V_{T1}$, the comparator 150 may be configured such that the output $V_{OUT}$ assumes one value once $V_{HPF}$ goes below $V_{T2}$ and another, different value once $V_{HPF}$ exceeds $V_{T1}$. Other variants providing the same functionality are also envisaged. Phrased more generally, a hysteretic comparator may provide an output signal $V_{OUT}$ which assumes one state/value while the signal $V_{HPF}$ is within a region of values bounded by the first and second threshold values, and which assumes another state/value when the signal $V_{HPF}$ is outside this region.

Although not illustrated in the FIGS. 1a and 1b, it is envisaged that e.g. power supply rails are provided to power e.g. the operational amplifier 110 and the comparison element/comparator 150.

The functionality of a circuit (such as the circuits 100 and 101 described with reference to FIGS. 1a and 1b, respectively) according to the present disclosure will now be described in further detail with reference to FIGS. 1a and/or 1b, and FIG. 2.

For a light sensor in form of e.g. a photodiode 120, the induced photocurrent $I_{PD}$ through the photodiode 120 may depend on an intensity of the incident light 126. For example, it may be envisaged that the photocurrent $I_{PD}$ changes between a low value $I_{PDL}$ for a low intensity of the incident light 126 and a high value $I_{PDH}>I_{PDL}$ for a high intensity of the incident light 126. A change ratio between the respective high and low values of the photocurrent $I_{PD}$ may be defined as $CR=I_{PDH}/I_{PDL}>1$. FIG. 2 illustrates schematically a plot 200 of an example of a photocurrent $I_{PD}$ as a function of time, including a change of the photocurrent $I_{PD}$ under a time interval between t=0 and t=$t_e$. A reduction of the intensity of the incident light 126 from a higher value to a lower value changes the photocurrent from a higher value $I_{PDH}$ to a lower value $I_{PDL}$ during a sub-interval between t=0 and t=$t_f$, and a later return of the intensity to the higher value changes the photocurrent back to the higher value $I_{PDH}$ during a later sub-interval between t=$t_b$ and t=$t_e$.

The induced photocurrent $I_{PD}$ may flow from the cathode to the anode of the photodiode 120. The operational amplifier 110 and the feedback loop 130 may control/regulate a voltage $V_{PD}$ across the photodiode 120 to (or at least towards) zero, and direct the photocurrent $I_{PD}$ through the circuit element (i.e. the diode 132). If the anode 124 of the photodiode 120 and the non-inverting input 114 of the operational amplifier 110 are connected to a potential $V_{CM1}$ (e.g. a ground), a potential at the inverting output 112 of the operational amplifier 110 (and at the respective cathodes 122 and 134 of the photodiode 120 and diode 130, respectively) will thus be controlled/regulated to $V_{CM1}$.

A voltage Vo across the diode 132 will thus depend on the photocurrent $I_{PD}$ in a logarithmic fashion. Assuming the diode 132 to be ideal, the voltage across the diode 132 may be approximated as $V_D=V_T*\ln(I_{PD}/I_S+1)$, where $V_T$ is a thermal voltage and $I_S$ a saturation current of the diode 132. Consequently, the signal $V_{AMP}$ output from the operation amplifier 110 is assumed to be $V_{AMP}=V_D+V_{CM1}$.

If an intensity of the incident light 126 changes from the high value to the low value, the photocurrent will change from $I_{PDH}$ to $I_{PDH}/CR$. This will result in a corresponding change in the signal $V_{AMP}$ from $V_T*\ln(I_{PDH}/I_S+1)+V_{CM1}$ to $VT*\ln(I_{PDH}/(CR*I_S)+1)+V_{CM1}$. Provided that $I_{PDH}/(CR*I_S) \gg 1$ (i.e. that $\exp(V_D/V_T) \gg 1$), the change in the signal $V_{AMP}$ may be expressed as $\Delta V_{AMP}=V_T*\ln(CR)$. Such an assumption may be made valid by e.g. sizing the diode 132 accordingly. At room temperature, the thermal voltage may be assumed to be approximately 26 mV. For a reduction in light intensity with a factor e (i.e. approximately 2.72), a difference in the voltage $V_{AMP}$ output by the operational amplifier 110 is approximately 26 mV. This provides a high dynamic range for the circuit of the present disclosure, and allows to detect e.g. the ratiometric change in dim indoor lighting conditions to bright outdoor lighting conditions. FIG. 2 illustrates schematically a plot 210 of an example of a signal $V_{AMP}$ as a function of time, including a change of $V_{AMP}$ during the above time interval from t=0 and t=$t_e$ resulting from the change in photocurrent $I_{PD}$ during the same time interval.

The high-pass filter 140 removes a DC content (i.e. a constant component) of the signal $V_{AMP}$, and produces a signal $V_{HPF}$. FIG. 2 illustrates schematically a plot 220 of a signal $V_{HPF}$ as a function of time. By high-pass filtering the signal $V_{AMP}$, the high-pass filtered signal $V_{HPF}$ includes a negative transition 222 which marks the start of the change in intensity of the incident light 126.

A negative transition 222 in the signal $V_{HPF}$ is detected by the comparison element (e.g. a comparator) 150. In one embodiment, this is obtained by comparing the amplitude of the signal $V_{HPF}$ against a first threshold value $V_{T1}$. When the amplitude of the signal $V_{HPF}$ goes below the threshold $V_{T1}$, the comparison element 150 changes the output signal $V_{OUT}$ from a first state (or voltage value) $V_{S1}$ to a second state (or voltage value) $V_{S2}$. Once the amplitude of the signal $V_{HPF}$ returns above the threshold $V_{T1}$ again, the output signal $V_{OUT}$ changes back to the first state $V_{S1}$. This is illustrated in FIG. 2, which illustrates schematically a plot 230 of an example of a signal $V_{OUT}$ as a function of time, where the change in intensity of the incident light 126 is indicated by a pulse 232 in the signal $V_{OUT}$.

In another embodiment, the comparison element (e.g. a hysteretic comparator) compares the signal $V_{HPF}$ also against a second threshold value $V_{T2}$, and changes the state of the output signal $V_{OUT}$ only when $V_{HPF}$ passes (or have passed, and in a same direction) both the first threshold value $V_{T1}$ and the second threshold value $V_{T2}>V_{T1}$. As illustrated schematically in FIG. 2 in a plot 240 of an example of another signal $V_{OUT}$ as a function of time, the signal $V_{OUT}$ changes from the first state $V_{S1}$ to the second state $V_{S2}$ once the amplitude of $V_{HPF}$ goes below the first threshold value $V_{T1}$, but does not return to the first state $V_{S1}$ until the amplitude of $V_{HPF}$ exceeds the second threshold value $V_{T2}$. This configuration also provides a pulse 242 indicating the start of the reduction in intensity of the incident light 126, but in a way which may be e.g. less sensitive to noise. If for example the amplitude of the signal $V_{HPF}$ were to fluctuate around the first threshold value $V_{T1}$, the embodiment using the hysteretic comparator would not (erroneously) output multiple pulses for each time $V_{HPF}$ fluctuates across the first threshold value $V_{T1}$, and may therefore provide a more stable way of indicating the change in intensity of the incident light 126 compared to e.g. the use of a single-threshold comparator as shown in the plot 230.

Figure 2:
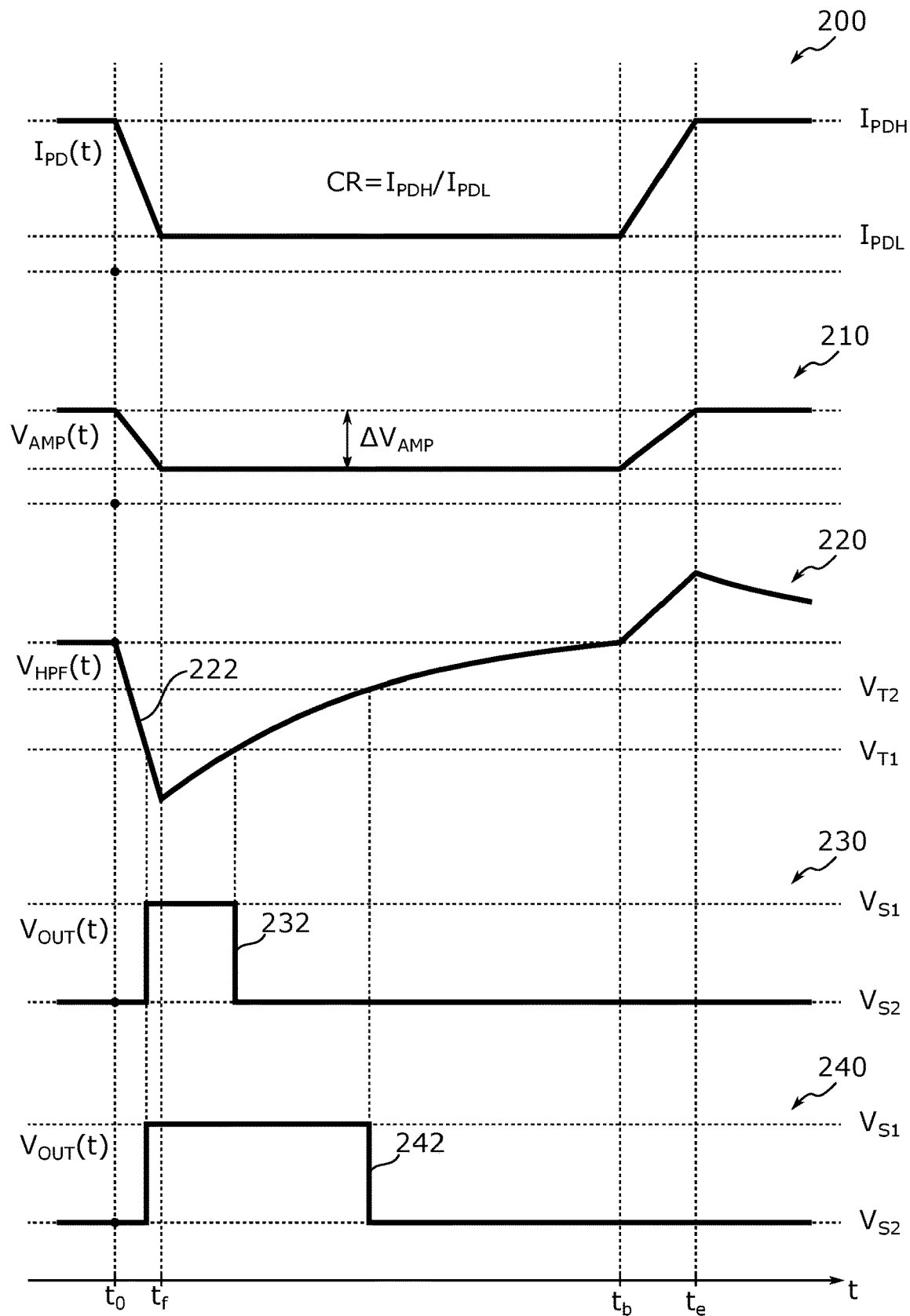
FIG. 2 illustrates schematically plots of various examples of signals provided in embodiments of a circuit according to the present disclosure.

It should be noted that in FIG. 2, all plots 200, 210, 220, 230 and 240 are plotted versus a same time coordinate (t), but on separate vertical axes which are also shifted vertically with respect to each other in order to enhance clarity of presentation. In each plot, the zero value of the respective vertical axis is indicated by a small, filled circle.

Figure 3:
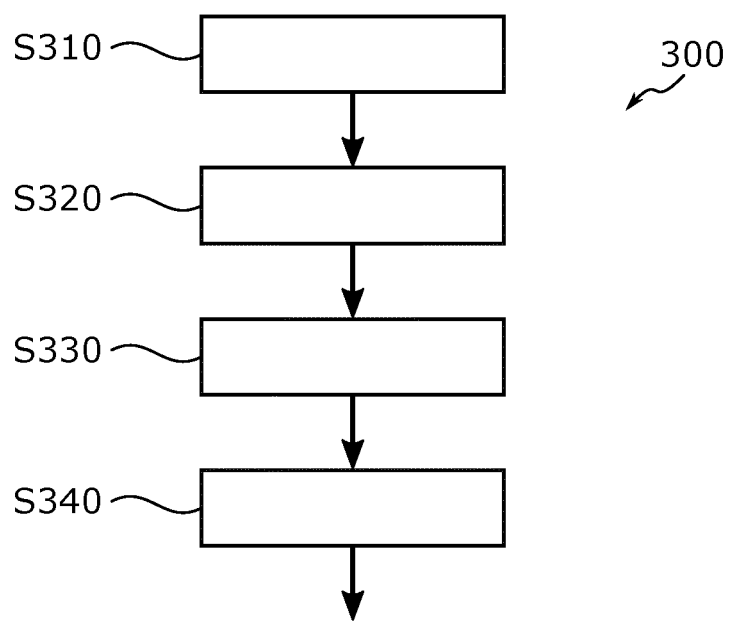
FIG. 3 illustrates schematically a flowchart of an embodiment of a method according to the present disclosure.

With reference to FIG. 3, various embodiments of a corresponding method of detecting a ratiometric change in an intensity of an incident light according to the present disclosure will now be described in more detail.

FIG. 3 illustrates schematically a flowchart of a method 300. In a first step S310, a light sensor is provided (if not already present). The light sensor is configured to induce a photocurrent through it as a function of an intensity of an incident light (hitting the light sensor). In a next step S320, an operational amplifier and a feedback loop including at least one circuit element having a logarithmic voltage-current dependence is used to regulate a voltage a cross the light sensor to zero. This provides that a photocurrent induced through the light sensor is passed through the at least one circuit element in the feedback loop. In a next step S330, a signal output from the operational amplifier is high-pass filtered to generate a high-pass filtered signal. In a next step S340, a change in the intensity of the incident light is detected by confirming that the high-pass filtered signal passes at least a first threshold value. As already described herein, this may for example correspond to an amplitude of the high-pass filtered signal exceeding (or falling below) the at least one threshold value. Although not illustrated in FIG. 3, the method 300 may operate in a cyclic fashion, and cycle back to the step S310 again to detect a further change in the intensity of the incident light.

In some embodiments of the method 300, the step S340 may alternatively include comparing the high-pass against both of the first threshold value and also a second threshold value different from the first threshold value, and detecting the change in the intensity of the incident light by confirming that the high-pass filtered signal passes (in a same direction) both the first threshold value and the second threshold value (i.e. by confirming that the high-pass filtered signal is outside a regional of values bounded by the first and second threshold values). For further details and/or advantages of such a way of detecting the change in intensity of the incident light, referral is made to the above description related to the use of a hysteretic comparator as the comparison element.

Figure 4:
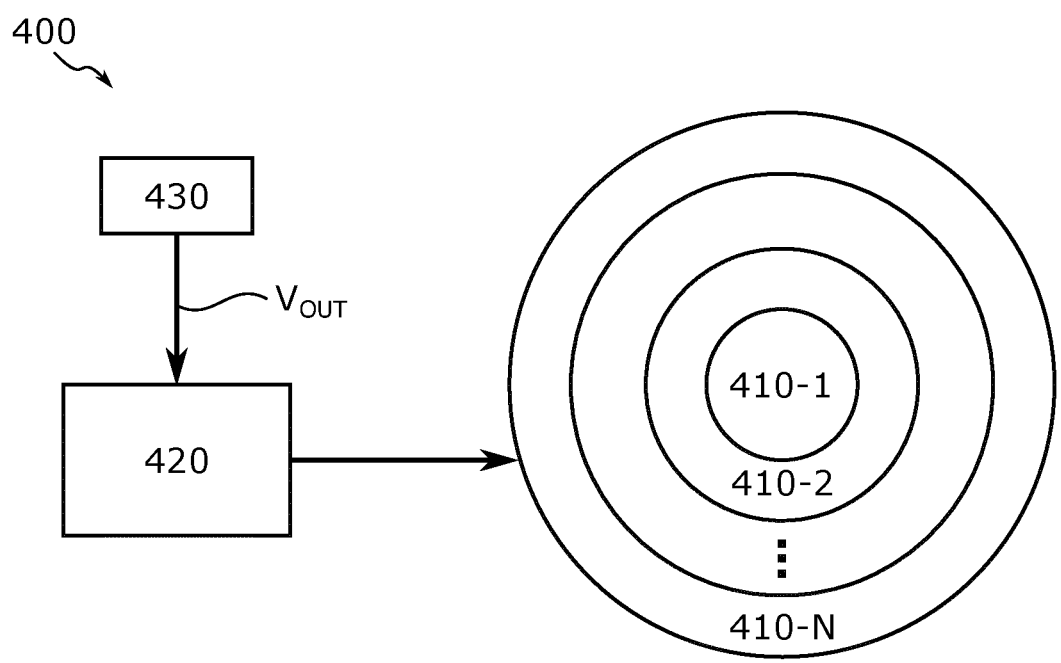
FIG. 4 illustrates schematically an embodiment of a smart contact lens according to the present disclosure.

With reference to FIG. 4, one or more embodiments of a smart contact lens according to the present disclosure will now be described in more detail.

FIG. 4 illustrates schematically a smart contact lens 400. The lens 400 includes one or more rings 410-1 to 410-N (where N is an integer such that N≥1). The one or more rings 410-1 to 410-N are concentrically arranged, but it is envisaged also that other suitable arrangements of the one or more rings 410-1 to 410-N may be provided, for example an approximately concentric arrangement, or similar. The rings 410-1 to 410-N may have different inner/outer diameters, and for example be arranged such that the smallest ring (e.g. the ring 410-1) is at the center and the other rings (e.g. 410-2 to 410-N) are arranged outwards of the ring 410-1 in order of increasing diameters. Each ring 410-1 to 410-N may be operable between a state having a lower attenuation of light (e.g. an "open state") and a state having a higher attenuation of light (e.g. a closed/shut state).

In some embodiments, the one or more rings 410-1 to 410-N may for example be of a twisted nematic (TN) or super twisted nematic (STN) type. In other embodiments, the one or more rings 410-1 to 410-N may be of a guest-host liquid crystal type, including a mix of e.g. a color dichroic dye, chiral dopant and liquid crystal. Such a type may be beneficial in that it may not need a polarizer to filter light. Such a type may also be driven in a direct current (DC) manner instead of an alternating current (AC) manner. Driving the one or more rings 410-1 to 410-N in a DC manner may further reduce the energy consumption, and thereby help to further reduce e.g. a battery capacity needed for driving the smart contact lens 400. It is envisaged also that rings of one or more other types than LCD may be used, as long as a same or similar functionality is obtained.

The lens 400 also includes a circuit 420. The circuit 420 may for example be a circuit such as the circuit 100 described with reference to FIG. 1a, or for example the circuit 101 described with reference to FIG. 1b, or other embodiments thereof. The circuit 420 is preferably arranged within the lens 400 such that, if the lens 400 is inserted into an eye of a user (not shown) such that the rings 410-1 to 410-N obtains the function of an artificial iris of the eye, and such that e.g. a light sensor of the circuit 420 is at least partly covered by an eye lid of the eye when the eye lid is partially or completely closed. It is also preferable that the lens 400 is further configured such that, when inserted into the eye of the user, as much of the lens 400 except the rings 410-1 to 410-N are arranged outside a field of visibility for the eye, in order not to disturb the sight of the user more than necessarily.

The circuit 420 is configured to detect a ratiometric change in an incident light intensity. The ratiometric change may be used by a controller 430 to control the one or more rings 410-1 to 410-N or be indicative of a beginning of a blinking of an eye of a user.

The ratiometric change may be detected by measuring absolute values of the incident light intensity and establishing threshold values and/or differences that correspond to e.g. the beginning of a blinking of the eye of the user.

The ratiometric change may also be detected by measuring relative values of the incident light intensity and detecting relevant changes, e.g. beyond a threshold.

The ratiometric change may be measured using e.g. a photodiode, photo-resistor and/or a photodetector.

The lens 400 includes a controller 430. The controller 430 is configured to operate the one or more rings 410-1 to 410-N (i.e. to operate each ring between its open and closed states, as needed) based on an intensity of an incident light (not shown) hitting the light sensor of the circuit 420, thereby together with the one or more rings 410-1 to 410-N emulating the functioning of an iris. The controller 430 is further configured to receive a signal $V_{OUT}$ output from the circuit 420 (e.g. from the comparison element or the light sensor) and to, as a response to the signal $V_{OUT}$ indicating a ratiometric change in the intensity of the incident light from a higher state to a lower state (e.g. a beginning of a blinking of the eye), initiate a re-polarization of the one or more rings 410-1 to 410-N. As a result, the rings 410-1 to 410-N may be re-polarized during a moment when the eye of the user is closed, and such that little or no visual flickering occurs due to the re-polarization. This provides an improvement over e.g. a lens in which the one or more rings are re-polarized without taking into account if the user is blinking or not, which may lead to flickering if the rings are re-polarized e.g. during a time when the eye lid is not closed or partially closed. Re-polarizing the one or more rings may, as described earlier herein, make the rings not lose their contrasts or, if for example rings of a ghost-host display type are used, also avoid degradation of the crystal cell(s).

Figure 5:
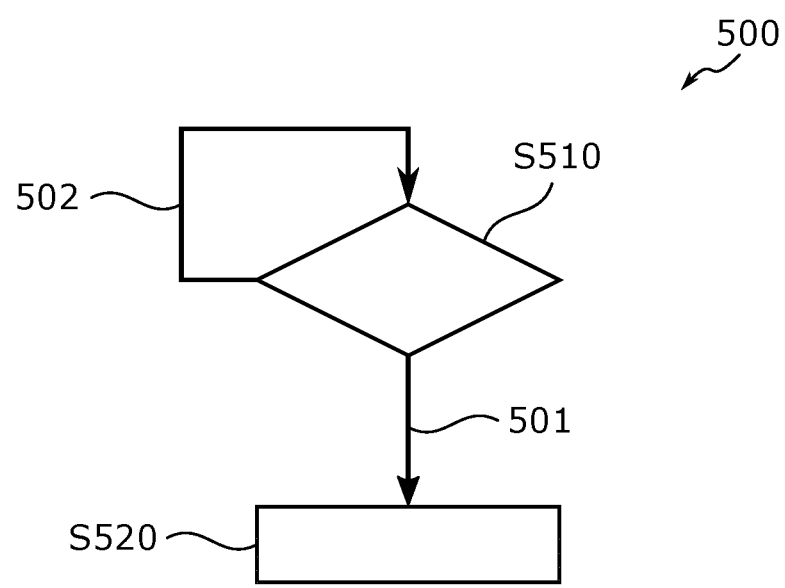
FIG. 5 illustrates schematically a flowchart of an embodiment of a method according to the present disclosure.

With reference to FIG. 5, various embodiments of a corresponding method of operating a smart contact lens (such as the contact lens 400 described with reference to FIG. 4) according to the present disclosure will now be described in more detail.

FIG. 5 illustrates schematically a flowchart of a method 500. In a first step S510, it is detected whether a ratiometric change in an intensity of an incident light has occurred using a circuit as described earlier herein and/or a method as described earlier herein, for example the circuits 100 and 101 described with reference to FIGS. 1a and 1b, and/or the method 300 described with reference to FIG. 3. Such a ratiometric change corresponds to at least a beginning of a blinking of an eye (into which the contact lens is inserted). If it is detected that such at least a beginning of a blinking of an eye has occurred, the method 500 proceeds 501 to a next step S520. In the step S520, a re-polarization of the one or more rings is initiated as a response to detecting that the beginning of the blinking of the eye in step has occurred. If no at least a beginning of a blinking of an eye is detected in step S510, the method may stop or repeat 502 the step S510 one or more additional times until such at least a beginning of a blinking of the eye is detected.

The present disclosure further envisages the use of a circuit and/or method as described herein for e.g. detection of a movement of an illuminated object. For example, a matrix of circuits configured to detect a blinking of an eye may be provided on a surface which is illuminated in a variable way when objects and/or e.g. people are moving. If one or more of the circuits detects a ratiometric change in an intensity of the incident light, such a change may be related to a movement of an object or e.g. a person. In contrast to other techniques for detecting movement, based on e.g. image processing, the present disclosure may offer an improved way of detecting a movement, including the benefits and advantages already recited herein when describing the use of a single circuit.

In general, the present disclosure provides a way of detecting a ratiometric change in an intensity of an incident light. Such a detection may be provided with high dynamic range, and work e.g. in dim indoor lighting conditions as well as in bright outside lighting conditions and conditions therebetween. A circuit as described herein may consume little power, have a small physical footprint, and be suitable to be used as for example a blink detector in a smart contact lens where it allows blinking to be detected reliably and independent of ambient light conditions. The circuit, and method, also provides a way of for example detecting a movement of an illuminated target.

The person skilled in the art realizes that the present disclosure is by no means limited to the embodiments described above. On the contrary, many modifications and variations are possible within the scope of the appended claims.

Although features and elements are described above in particular combinations, each feature or element may be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

Various aspects of the present disclosure may be appreciated from the following enumerated example embodiments, EEEs:

EEE 1. A circuit (100, 101) for detecting a ratiometric change in an incident light intensity, comprising:
an operational amplifier (110);
a light sensor (120) configured to induce a photocurrent (Iso) through it as a function of an intensity of an incident light (126), and connected to an inverting input (112) of the operational amplifier;
a feedback loop (130) connecting an output (116) of the operational amplifier to the inverting input of the operational amplifier, said feedback loop comprising at least one circuit element (132) having a logarithmic voltage-current dependence;
a high-pass filter (140) configured to filter a signal ($V_{AMP}$) output from the operational amplifier to generate a high-pass filtered signal ($V_{HPF}$), and
a comparison element (150) configured to compare the high-pass filtered signal with at least a first threshold value and to output a signal ($V_{OUT}$) which, as a response to an amplitude of the high-pass filtered signal passing the at least a first threshold value, changes to indicate a ratiometric change in the intensity of the incident light.

EEE 2. The circuit of EEE 1, wherein the light sensor is connected between the inverting input and a non-inverting input (114) of the operational amplifier.

EEE 3. The circuit of EEE 1 or 2, wherein the at least one circuit element is or includes a diode or at least a two-terminal element behaving like a diode.

EEE 4. The circuit of EEE 3, wherein the at least one circuit element is arranged in the feedback loop with one terminal towards the inverting input of the operational amplifier and another terminal towards the output of the operational amplifier.

EEE 5. The circuit of anyone of the preceding EEEs, wherein the comparison element is a comparator.

EEE 6. The circuit of EEE 5, wherein the comparator is a hysteretic comparator, and wherein the signal output from the comparator changes as a response to the high-pass filtered signal passing both the first threshold value and a second threshold value different from the first threshold value.

EEE 7. The circuit of anyone of the preceding EEEs, wherein the high-pass filter has a corner frequency depending on a required rate of change of the circuit.

EEE 8. The circuit of anyone of the preceding EEEs, wherein the high-pass filter is of a switched capacitor type.

EEE 9. A method (300) of detecting a ratiometric change in an intensity of an incident light, comprising:
providing (S310) a light sensor configured to induce a photocurrent through it as a function of an intensity of an incident light;
regulating (S320), by using an operational amplifier and a feedback loop including at least one circuit element having a logarithmic voltage-current dependence, a voltage across the light sensor to zero;
high-pass filtering (S330) a signal output from the operational amplifier to generate a high-pass filtered signal, and detecting (S340) a change in the intensity of the incident light by confirming that the high-pass filtered signal passes at least a first threshold value.

EEE 10. The method of EEE 9, wherein said detecting a change in the intensity of the incident light includes confirming that the high-pass filtered signal passes both the first threshold value and a second threshold value different from the first threshold value.

EEE 11. Use of the circuit (100, 101) of any one of EEEs 1 to 8 and/or the method (300) of EEE 9 or 10 to detect a blinking of an eye.

EEE 12. Use of the circuit (100, 101) of any one of EEEs 1 to 8 and/or the method (300) of EEE 9 or 10 to detect a movement of an illuminated object.

EEE 13. A smart contact lens (400), comprising:
one or more of, preferably concentric, rings (410-1, 410-2, ..., 410-N) of a liquid crystal display, LCD, type, each ring being operable between a state having a lower attenuation of light and a state having a higher attenuation of light;
a circuit (420, 100, 101) according to any one of EEEs 1 to 8;
a controller (430) configured to operate the one or more rings based on an intensity of an incident light, to receive the signal ($V_{OUT}$) output from the comparison element and to, as a response to said signal indicating a ratiometric change in the intensity of the incident light from a higher intensity state to a lower intensity state, initiate a re-polarization of the one or more rings.

EEE 14. A method (500) of operating a smart contact lens (400) including one or more, preferably concentric, rings (410-1, 410-2, ..., 410-N) of a liquid crystal display, LCD, type, comprising:
detecting (S510), using a circuit (100, 101) according to any one of EEEs 1 to 8 and/or a method (300) according to any one of EEEs 9 to 11, whether a ratiometric change in an intensity of an incident light corresponding to at least a beginning of a blinking of an eye has occurred and, in response to detecting that such at least a beginning of a blinking of an eye has occurred, initiating (S520) a re-polarization of the one or more rings.

The invention claimed is:

1. A smart contact lens, comprising:
one or more, preferably concentric, rings of a liquid crystal display, LCD, type, each ring being operable between a state having a lower attenuation of light and a state having a higher attenuation of light;
a circuit for detecting a ratiometric change in an incident light intensity; and
a controller configured to operate the one or more rings based on an intensity of an incident light and to, as a response to the circuit detecting a ratiometric change in the intensity of the incident light from a higher intensity state to a lower intensity state indicating that blinking of an eye is detected, initiate a re-polarization of the one or more rings.

2. The smart contact lens of claim 1, wherein the circuit comprises a light sensor configured to induce a photocurrent through it as a function of an intensity of an incident light.

3. The smart contact lens of claim 1, wherein the circuit comprises an operational amplifier.

4. The smart contact lens of claim 3, wherein the circuit comprises a light sensor configured to induce a photocurrent through it as a function of an intensity of an incident light and wherein the light sensor is connected to an inverting input of the operational amplifier.

5. The smart contact lens of claim 3, wherein the circuit comprises a feedback loop connecting an output of the operational amplifier to an inverting input of the operational amplifier, said feedback loop comprising at least one circuit element having a logarithmic voltage-current dependence.

6. The smart contact lens of claim 3, wherein the circuit comprises a high-pass filter configured to filter a signal output from the operational amplifier to generate a high-pass filtered signal.

7. The smart contact lens of claim 6, wherein the circuit comprises a comparison element configured to compare the high-pass filtered signal with at least a first threshold value and to output a signal which, as a response to an amplitude of the high-pass filtered signal passing the at least a first threshold value, changes to indicate a ratiometric change in the intensity of the incident light.

8. The smart contact lens of claim 7, wherein the circuit comprises a light sensor configured to induce a photocurrent through it as a function of an intensity of an incident light and wherein the light sensor is connected between the inverting input and a non-inverting input of the operational amplifier.

9. The smart contact lens of claim 7, wherein the at least one circuit element is or includes a diode or at least a two-terminal element behaving like a diode.

10. The smart contact lens of claim 9, wherein the at least one circuit element is arranged in the feedback loop with one terminal towards the inverting input of the operational amplifier and another terminal towards the output of the operational amplifier.

11. The smart contact lens of claim 7, wherein the comparison element is a comparator.

12. The smart contact lens of claim 11, wherein the comparator is a hysteretic comparator, and wherein the signal output from the comparator changes as a response to the high-pass filtered signal passing both the first threshold value and a second threshold value different from the first threshold value.

13. The smart contact lens of claim 7, wherein the high-pass filter has a corner frequency depending on a required rate of change of the circuit.

14. The smart contact lens of claim 7, wherein the high-pass filter is of a switched capacitor type.

15. A method of operating a smart contact lens including one or more, preferably concentric, rings of a liquid crystal display, LCD, type, comprising:
detecting, using a circuit according to claim 1 comprised in the smart contact lens, whether a ratiometric change in an intensity of an incident light corresponding to at least a beginning of a blinking of an eye has occurred and,
in response to detecting that such at least a beginning of a blinking of an eye has occurred, initiating a re-polarization of the one or more rings.

* * * * *